United States Patent
Gont et al.

(10) Patent No.: US 6,738,957 B2
(45) Date of Patent: May 18, 2004

(54) SCHEMATIC ORGANIZATION TOOL

(75) Inventors: Val Gont, Kanata (CA); Jason Abt, Kanata (CA); Larry Lam, Orleans (CA); Alexei Ioudovski, Nepean (CA)

(73) Assignee: Semiconductor Insights Inc., Ottawa (CA)

( * ) Notice: Subject to any disclaimer, the term of this patent is extended or adjusted under 35 U.S.C. 154(b) by 0 days.

(21) Appl. No.: 09/920,734

(22) Filed: Aug. 3, 2001

(65) Prior Publication Data

US 2002/0023107 A1 Feb. 21, 2002

(30) Foreign Application Priority Data

Aug. 9, 2000 (CA) .............................. 2315456

(51) Int. Cl.$^7$ .............................................. G06F 17/50
(52) U.S. Cl. ............................................. 716/11; 716/1
(58) Field of Search ....................................... 716/1–14

(56) References Cited

U.S. PATENT DOCUMENTS

| | | | |
|---|---|---|---|
| 4,791,586 A | 12/1988 | Maeda et al. ................... | 716/5 |
| 4,835,704 A | 5/1989 | Eichelberger et al. ........ | 716/21 |
| 5,086,477 A * | 2/1992 | Yu et al. ........................ | 348/87 |
| 5,191,213 A * | 3/1993 | Ahmed et al. .............. | 250/307 |
| 5,210,699 A | 5/1993 | Harrington ..................... | 716/5 |
| 5,384,710 A | 1/1995 | Lam et al. .................... | 716/11 |
| 5,490,095 A | 2/1996 | Shimada et al. ............... | 716/5 |
| 5,572,437 A | 11/1996 | Rostoker et al. .............. | 716/18 |
| 5,629,858 A | 5/1997 | Kundu et al. .................. | 716/1 |
| 5,694,481 A | 12/1997 | Lam et al. .................. | 382/145 |
| 6,236,746 B1 | 5/2001 | Chamberlain et al. ...... | 382/145 |
| 6,499,129 B1 | 12/2002 | Srinivasan et al. ............ | 716/4 |
| 2002/0062474 A1 * | 5/2002 | Hashimoto ................... | 716/11 |

OTHER PUBLICATIONS

"Schematic Design Tools—User' Guide ", 1992, OrCAD, pp. 82–93.*
Schematic Design Tools—Reference Guide, 1992, OrCAD, pp. 304–315.*
"PC Board Layout Tool 386+ User's Guide)" 1992, OrCAD, pp. 18–31.*
U.S. patent application Ser. No. 09/920,843, Ioudovski, filed Aug. 3, 2001.
U.S. patent application Ser. No. 10/267,994, Abt et al., filed Oct. 10, 2002.
Boehner, *Logex –An Automatic Logic Extractor from Transistor to Gate Level for CMOS Technology*, 25$^{th}$ ADM/IEEE Design Automation Conference, 1988 IEEE, Paper 34.2, pp. 517–522.
Dukes et al., *A Generalized Extraction System for VLSI*, ASIC Conference and Exhibit, 1991, Proceedings, Fourth Annual IEEE International, Sep. 23–27, 1991, pp. P4–8.1–P4–8.4.
Hübner et al., *Efficient Partitioning and Analysis of Digial CMOS–Circuits*, 1992 IEEE, pp. 280–283.
Li et al., *Layout Extraction and Verification Methodology for CMOS I/O Circuits*, Design Automation Conference, 1998, Proceedings, Jun. 15–19, 1998, pp. 291–296.

* cited by examiner

Primary Examiner—Vuthe Siek
Assistant Examiner—Sun James Lin
(74) Attorney, Agent, or Firm—Sterne, Kessler, Goldstein & Fox P.L.L.C.

(57) ABSTRACT

A process in a computer system for generating a high level schematic from a project schematic of basic components which comprises scanning the project schematic for a predetermined cell, wherein the cell is made up of a select group of components and their interconnections, and replacing the select group of components on every occurrence that it is found in the project schematic by a cell symbol having input and outputs to generate the high level schematic. The process may also be repeated for other predetermined cells which may be selected from a library or created by the user.

11 Claims, 8 Drawing Sheets

| SignalID | PIN(IN/OUT) | FIGURE | NAME | TITLE | Description |
|---|---|---|---|---|---|
| A0 | IN | 4 | ADDRESS4 | ADDRESS PATH | |
| A1 | IN | 4 | ADDRESS4 | ADDRESS PATH | |
| A14 | IN | 4 | ADDRESS4 | ADDRESS PATH | |
| A15 | IN | 4 | ADDRESS4 | ADDRESS PATH | |
| A16 | IN | 4 | ADDRESS4 | ADDRESS PATH | |
| A17 | IN | 4 | ADDRESS4 | ADDRESS PATH | |
| A2 | IN | 4 | ADDRESS4 | ADDRESS PATH | |
| A3 | IN | 4 | ADDRESS4 | ADDRESS PATH | |
| A4 | IN | 4 | ADDRESS4 | ADDRESS PATH | |
| A8 | IN | 4 | ADDRESS4 | ADDRESS PATH | |
| A8.17.16.15.14_0 | | 4 | ADDRESS4 | ADDRESS PATH | Bank selection signals |
| A8.17.16.15.14_0 | | 4 | ADDRESS4 | ADDRESS PATH | Bank selection signals |
| A8.17.16.15.14_0 | | 3 | DATAPATH | DATA PATH | Bank selection signals |
| A8.17.16.15.14_0 | | 3 | DATAPATH | DATA PATH | Bank selection signals |
| A8.17.16.15.14_0 | | 4 | ADDRESS4 | ADDRESS PATH | Bank selection signals |
| A8.17.16.15.14_1 | | 3 | DATAPATH | DATA PATH | Bank selection signals |
| A8.17.16.15.14_1 | | 3 | DATAPATH | DATA PATH | Bank selection signals |
| A8.17.16.15.14_1 | | 4 | ADDRESS4 | ADDRESS PATH | Bank selection signals |
| A8.17.16.15.14_1 | | 4 | ADDRESS4 | ADDRESS PATH | Bank selection signals |
| A8.17.16.15.14_1 | | 4 | ADDRESS4 | ADDRESS PATH | Bank selection signals |
| A8.17.16.15.14_14 | | 4 | ADDRESS4 | ADDRESS PATH | Bank selection signals |

Figure 8

| SignalID | PIN(IN/OUT) | FIGURE | NAME | TITLE | Description |
|---|---|---|---|---|---|
| A8 | IN | 4 | ADDRESS4 | ADDRESS PATH | |
| A9 | IN | 4.1 | BA-P01B | ADDRESS INPUT BUFFERS | |
| A8.17.16.15.14 | IN | 4.8.1 | EG-P02 | GROUP OF 8 WORDLINE DRIVERS | |
| A8.17.16.15.14 | OUT | 4.5.1 | GA-P08 | BANK SELECTION DECODER | |
| A8.17.16.15.14_0 | IN | 4.8.2 | EG-P03 | REDUNDANT WORDLINE DRIVER | Bank selection signals |
| A8.17.16.15.14_0 | IN | 4.9 | EG-P05 | COLUMN DECODDING AND DRIVE... | Bank selection signals |
| A8.17.16.15.14_0 | IN | 4.9.1 | EG-P04 | COLUMN DECODER AND DRIVER | Bank selection signals |
| A8.17.16.15.14_0 | IN | 3.7 | EG-P07 | SENSE CLOCKS FOR A BANK OF S... | Bank selection signals |
| A8.17.16.15.14_0 | IN | 4.8 | EG-P02B | WORDLINE DRIVERS FOR ONE AR... | Bank selection signals |
| A8.17.16.15.14_[0:15] | IN | 3 | DATAPATH | DATA PATH | Row address signals |
| A8.17.16.15.14_[0:15] | BUS | 4 | ADDRESS4 | ADDRESS PATH | Row address signals |
| A8.17.16.15.14_[0:15] | BUS | 3 | DATAPATH | DATA PATH | Row address signals |
| A8.17.16.15.14_[0:15] | BUS | 4.5 | GA-P08B | BANK SELECTION DECODING (A17... | Row address signals |
| A8.17.16.15.14_[0:15] | OUT | 4.5 | GA-P08B | BANK SELECTION DECODING (A17... | Row address signals |
| A814 | IN | 4.5.1 | GA-P08 | BANK SELECTION DECODER | Bank select signal |
| A815 | IN | 4.5.1 | GA-P08 | BANK SELECTION DECODER | Bank select signal |
| A816 | IN | 4.5.1 | GA-P08 | BANK SELECTION DECODER | |
| A817 | IN | 4.5.1 | GA-P08 | BANK SELECTION DECODER | |
| A8[14:17] | BUS | 4.5 | GA-P08B | BANK SELECTION DECODING (A17... | Bank selection signals |
| A8[14:17] | OUT | 4.4 | GA-P04C | ADDRESS COMPARISON AND MUL... | Bank selection signals |

SCHEMATIC ORGANIZATION TOOL

CROSS-REFERENCE TO OTHER APPLICATIONS

This application claims the benefit of the Canadian Patent Application Serial No. 2,315,456, filed Aug. 9, 2000.

Furthermore, the following applications of common assignee are related to the present application, have the same filing dates as the present application, and are incorporated by reference herein in their entireties:

"Gate Extractor", Ser. No. 09/920,843; and

"Advanced Schematic Editor", Ser. No. 09/920,937.

FIELD OF THE INVENTION

The invention relates generally to automated design analysis and more particularly to a tool for generating organized high level schematics from the transistor images of a die.

BACKGROUND OF THE INVENTION

In the intensely competitive field of microelectronics, detailed analysis of a semiconductor integrated circuit product can provide valuable information as to how a particular technical problem was addressed, overall strengths and weaknesses of a design approach, and such matters. This information can be used to make decisions regarding market positioning, future designs, and new product development. The information produced from analysis of the product is typically provided through circuit extraction (reverse engineering), functional analysis, and other technical means. At the core of this activity is the process of design analysis which, in this context, refers to the techniques and methodology used to derive a complete or partial set of schematics from any type of integrated circuit manufactured using any process technology. For such technical information to be of strategic value it must be accurate and cost effective, and it is very important that the information should generated in a timely manner.

A design analysis process typically involves skilled engineers manually extracting circuit information from a set of large "photomosaics" of an integrated circuit (IC). Skilled technicians and engineers perform the following sequential tasks:

(1) A high magnification image of a small portion of an IC is captured using a camera or electron microscope such as a SEM. The IC has been processed to expose a layer of interest.

(2) Step (1) is repeated for all of the various regions of interest of the layer of the IC, ensuring that sufficient overlap exists between adjacent images that will be used to create the photomosaics.

(3) Create Photomosaics: all adjacent photographs associated with the given IC layer are aligned and taped together.

(4) Steps (1)–(3) are repeated for every layer necessary to construct a layout database of the IC. All layers include interconnect layers. For example, four sets of photomosaics are required for a device with three layers of metal and one layer of polysilicon.

(5) Circuit Extraction: transistors, logic gates, and other elements employed in the IC are identified by manually, visually examining the polysilicon and lower metal interconnects photomosaics. Interconnections between circuit elements are traced and this information is captured in the form of schematic drawings. The drawings are manually checked against the photomosaics and any obvious errors are corrected.

(6) Organize Schematics: the schematic drawings are organized into hierarchical functional/logical blocks.

(7) Capture Schematics: the schematic drawings are entered into a computer using computer aided engineering (CAE) software tools for subsequent simulation and functional analysis of the IC.

The results of these substantially manual techniques for circuit extraction are often difficult to analyze. Difficulties arise in tracing signals that travel between several schematics. Locating the schematics associated with a particular signal can be very time consuming. During the circuit extraction process, signals are commonly given a generic name or label as a reference. Further analysis will reveal the purpose or function of these signals. The signals should then be renamed so that their name indicates their function. The signal renaming process creates two problems. Firstly, it takes some time to locate each schematic associated with a particular signal such that the signal can be relabeled on each schematic where it appears. Secondly, guaranteeing that the signal has been renamed on each schematic is difficult. This can result in inconsistencies with signal names that can confuse the engineer attempting to analyze the circuitry.

Another time consuming task associated with this manual circuit extraction process is the creation of signal and schematic lists. It is often useful to have a cross-reference between signal names and the name or number of the schematic in which these signals appear. However, such a cross-reference is very labor intensive to produce.

Once the schematics have been entered into a computer for simulation and/or subsequent analysis, it becomes difficult to edit the schematics. For example, as the circuit analysis progresses, it frequently becomes necessary to redraw certain schematics or to transfer portions of one schematic to another. Editing a set of schematics in such a way can often cause errors in the net list which require manual correction. Signal names and other labels on the revised schematics will also have to be manually changed.

Other than the manual method described above, the design analysis process can alternatively employ an automated circuit extraction process such as the one described in U.S. Pat. No. 5,694,481 which issued on Dec. 2, 1997 to Lam et al. Lam discloses an automated system for extracting design information from a semiconductor integrated circuit by imaging layers of an IC, creating a mosaic of the images, identifying the circuit elements, developing a basic net list of the circuit element connections, organizing the net list into functional blocks, and generating schematic diagrams.

Unfortunately, the circuit extraction method disclosed by Lam has the same restrictions as the manual method when in comes to locating signals and schematics, creating signal and schematic lists, and editing existing schematics. In fact, the automated method adds the burden of identifying logic gates and standard cells from a randomly organized net list. An engineer is required to sort through the schematics to convert the connected transistors into the relevant logic gates and standards cells. Obviously, this can take a very long period of time.

The results of these substantially manual techniques for circuit extraction are difficult to analyze since the resulting schematics are difficult to follow.

Therefore, there is a need for a tool to generate organized schematics at such a level that they may be properly and efficiently analysed as to their functionality.

SUMMARY OF THE INVENTION

The invention is directed to a process in a computer system for generating a high level schematic from a project schematic of basic components which comprises scanning the project schematic for a predetermined cell, wherein the cell is made up of a select group of components and their interconnections, and replacing the select group of components on every occurrence that it is found in the project schematic by a cell symbol having input and outputs to generate the high level schematic. The process is then repeated for other predetermined cells.

In accordance with one aspect of the invention, the project schematic is represented by a project netlist of components and their interconnections, and wherein a cell netlist is generated for each of the cells to be searched in the project netlist. The cell netlists may be selected from a library of cell netlists or they may be generated through the creation of a cell schematic of a group of components and their interconnections.

In accordance with a further aspect of the invention, a netlist of the high level schematic may be generated to form a database for storage on a computer readable medium. The data includes cell names, signal labels for input and output signals between the cells, and cell schematic page numbers on which each signal is found. The data may further include a description of each cell function.

In accordance with another aspect of the invention, the process may further include dividing the project schematic into two or more subprojects, and generating individual project netlists for each subproject such that each subproject may be processed separately.

In accordance with a further aspect of this invention, a computer system is adapted to manipulate data from a high level schematic in one or more of the following ways: to sort the data by signal labels, to sort the data by inputs and outputs, to sort the data by schematic page number, to sort the data by cell names, to rename the signal labels, to describe the cell functions, to check the signals for errors, to modify the gate length data, to edit local pin segments, and to convert signal labels with identical labels to signal labels with unique labels.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein:

FIG. 8 is a GUI illustration of the Schematic Organization Tool highlighting the signal list;

FIG. 9 is a GUI illustration of the Schematic Organization Tool highlighting the I/O list.

DETAILED DESCRIPTION OF THE INVENTION

Figure 1A:
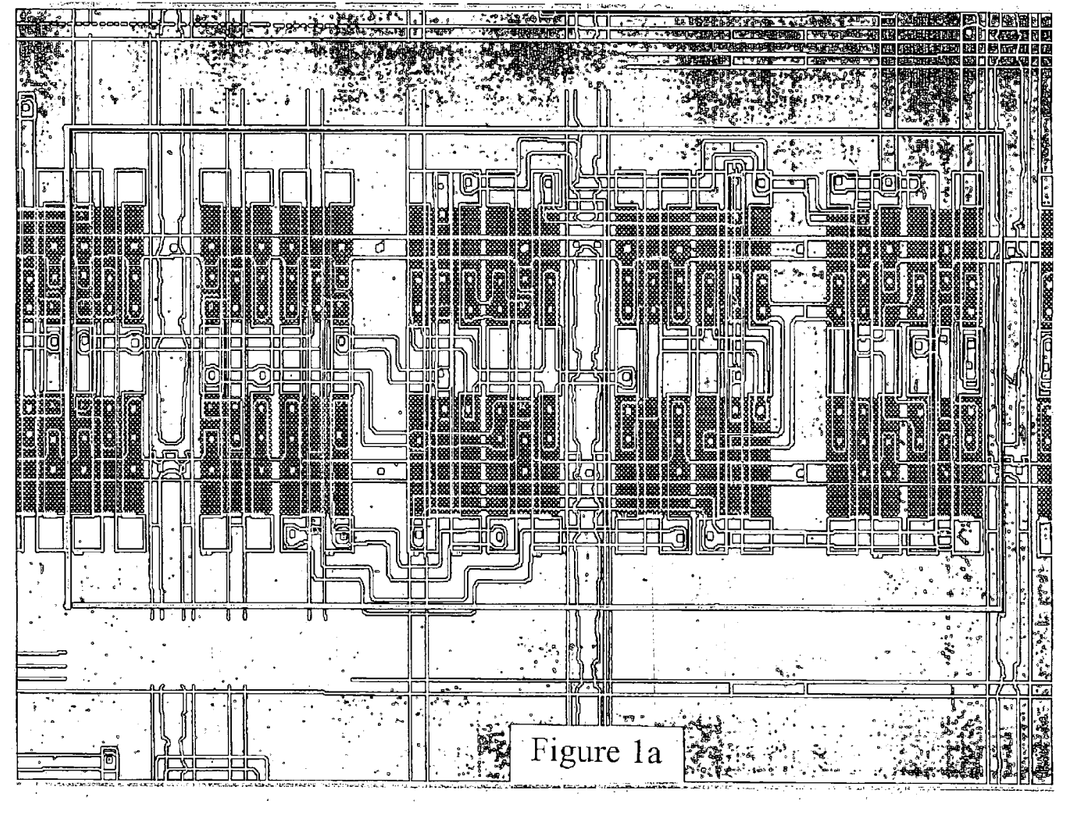
FIG. 1a illustrates a transistor layout obtained from IC images.

The present invention comprises a novel process of generating an organized high level schematic of the IC. The process can be initiated at the IC schematic layout level which represents the transistors identified in the IC by pattern recognition of the polysilicon crossing diffusion points with the basic netlist of the connections between the transistors, generated from the layout. FIG. 1 illustrates the transistor layout obtained of IC images through pattern recognition of polysilicon crossing diffusion points. Recognition routines find the interconnection information of the transistors to form a netlist which is generally highly disorganized since it simply lists the interconnections between transistors. A graphical representation of the transistors and their interconnections can be formed from the netlist into a schematic, however it too will not be organized. In this specification, the terms netlist and wire list are generally considered to be synonymous, whereas signal list is a data extraction from the netlist or wire list.

Figure 1B:
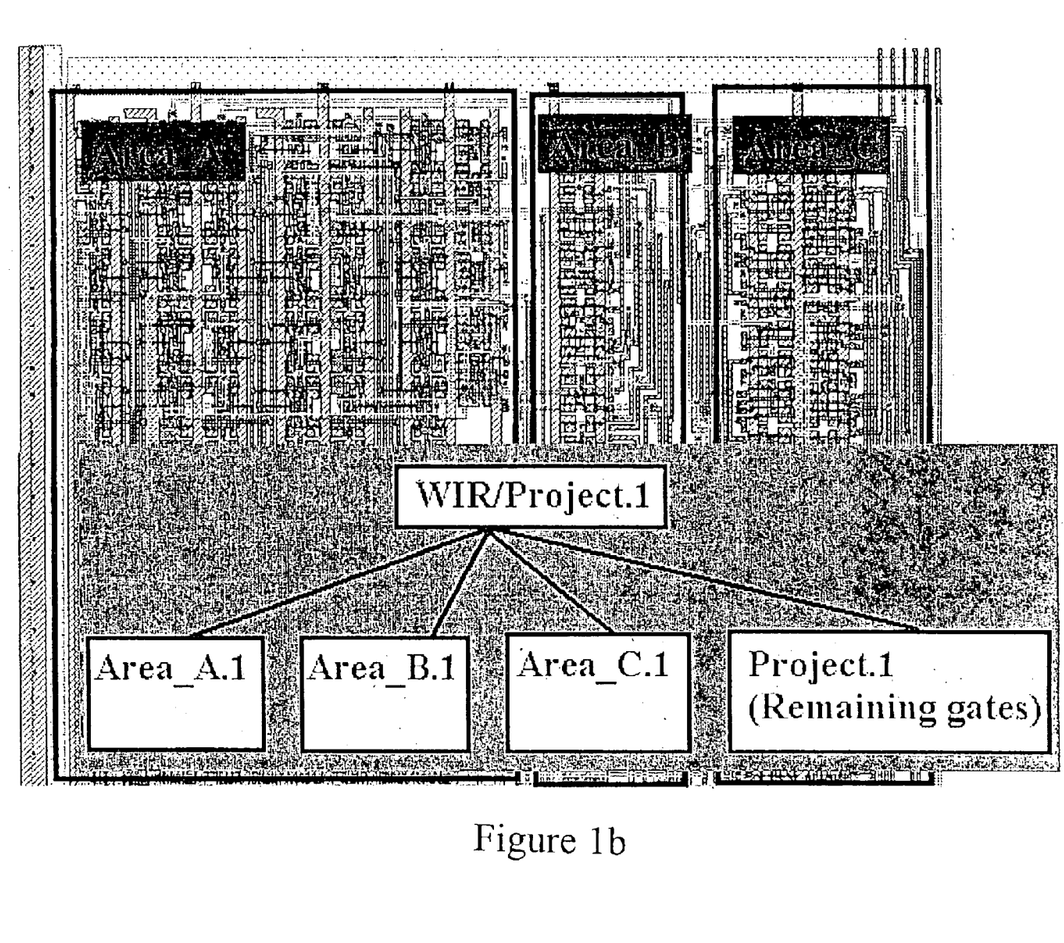
FIG. 1b illustrates a transistor layout which is divided into three main subprojects.

Most analysis projects involving integrated circuits involve a huge set of transistors in the layout. It is often desirable to simplify the schematic that is being analysed by dividing it into functional subsections for individual analysis. Such a division is illustrated in FIG. 1b where the project is shown as being divided into subprojects A, B and C as well as any remaining gates/transistors.

Figure 2:
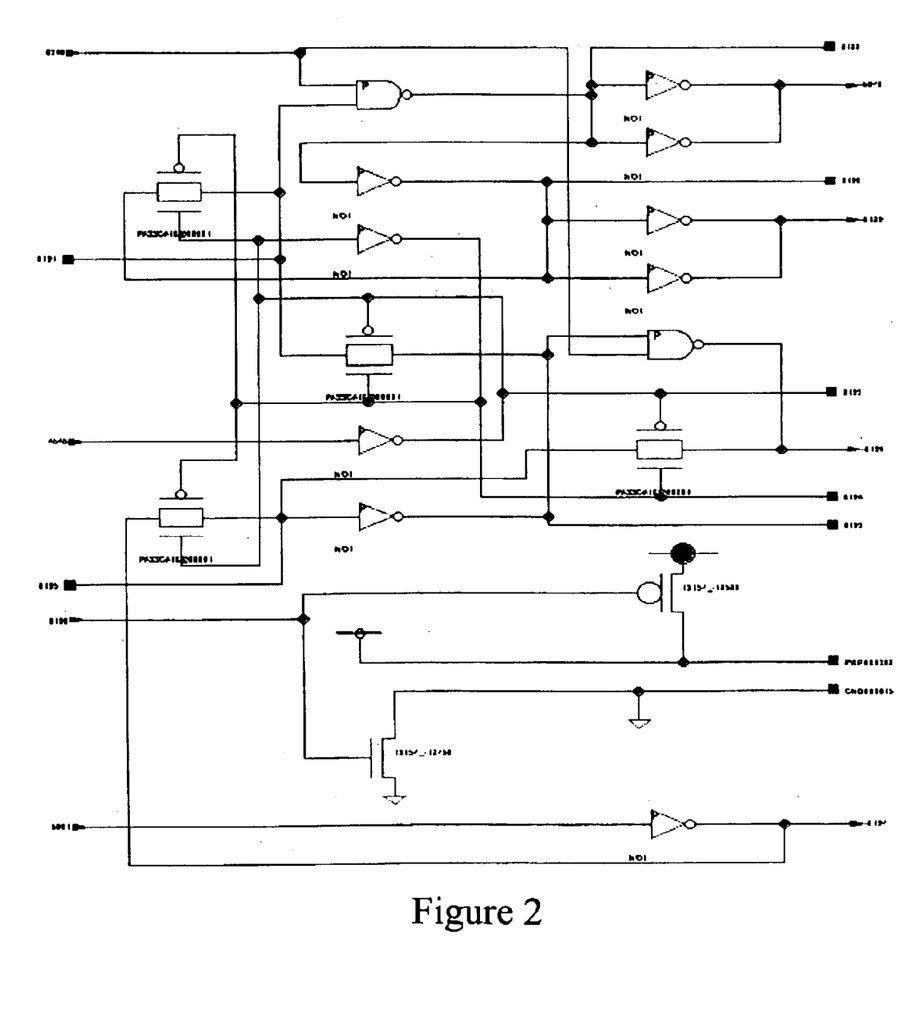
FIG. 2 illustrates a cell/component schematic in accordance with the present invention.
Figure 3:
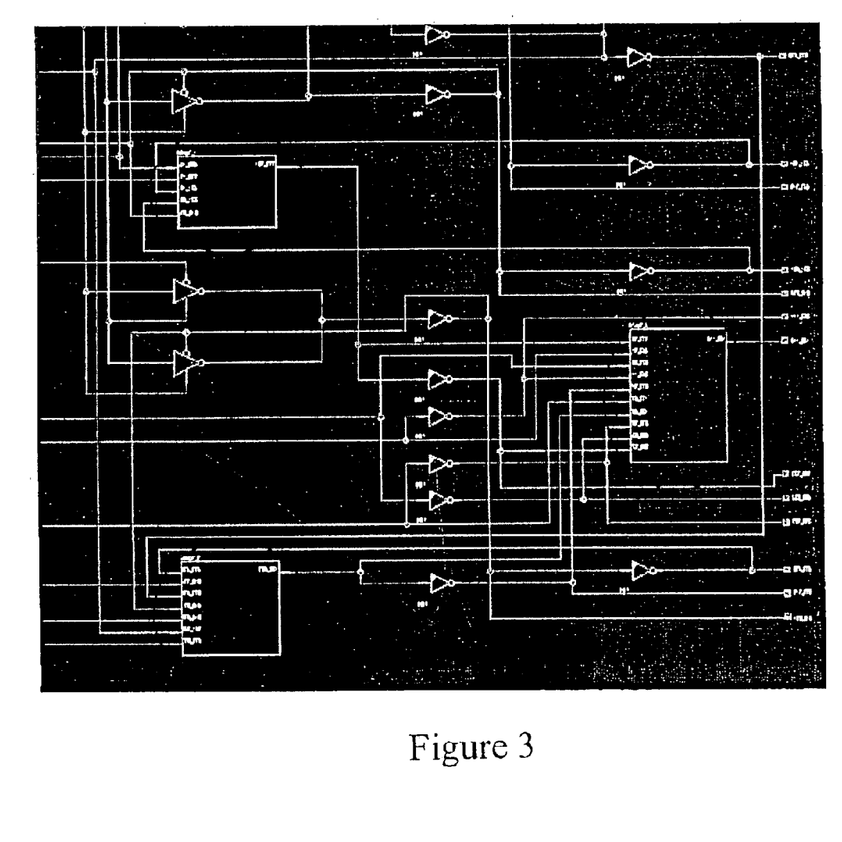
FIG. 3 illustrates a high level schematic in accordance with the present invention.

In addition, the schematic is simplified by extracting certain functional cells made up of transistor groups from the transistor netlist and replacing the transistor groups with a functional cell symbol. The novel process for generating a high level organized schematic of the IC is normally initiated at the project schematic level from which meaningful groups of transistors forming functional cells are identified on the layout and are replaced on the schematic by representative cell symbols. An example of a tool that may be used to extract groups of transistors that represent functional components by defined graphical representations is described in a co-pending patent application entitled Gate Extractor filed by Ioudovski on even date with this application and which is incorporated herein by reference. The project schematic may include a combination of defined cells, such as gates extracted by the above Gate Extractor, as well as transistors, together with a net list of their interconnections and is ideal for continuing the present process for generating a high level organized schematic. An example of such a project schematic is illustrated in FIG. 2 which shows a schematic made up of various interconnected simple cells including individual transistors. Though this schematic is more readable than the basic transistor schematic, it is still somewhat disorganized since complex functional cells cannot be easily recognized.

The process in accordance with the present invention comprises the following steps where the term components includes gates and transistors which are found in the project schematic.

Individual cell schematics of groups of interconnected components which form particular meaningful functional cells may be computer created after studying the project schematic and/or similar types of individual cell schematics may be obtained from a library of common cell schematics created prior to the project. A pattern template is created to represent the cell. The pattern template for each cell identifies the components within the cell with their interconnections.

Graphical representations or symbols of the cells are created by the user showing their inputs and outputs.

The project schematic is searched for each of the cells in question. To speed up the search, the project is converted into an array of gate objects that potentially can be grouped into cells. Each gate object defines an instance of a cell component with the following properties: gate label, location, pin order, wire connections, and pin type. Further increases in cell extraction speed can be achieved by mapping wire connection labels with integers so that comparison and analysis is performed on integers rather than strings.

When a component group corresponding to a cell pattern template is found, it is replaced in the schematic by its graphical representation with its inputs and outputs appropriately connected.

The netlist for the project schematic is updated by replacing the group of components and their interconnection data by the cell name and its inputs and outputs.

The resulting schematic generated is a high level schematic which is hierarchally highly organized and facilitates analysis due to the easily recognizable functionality of the circuits.

Though the size of the final schematic for an IC has been reduced substantially since it now includes symbols of functional cells, it can still require several hundreds of pages. Conventionally, input and output signals are labelled on the schematic and this is particularly important between pages, ie where a signal originates on one page and is used as an input to one or more cells on one or more pages. In order to facilitate the interpretation of the schematics, a database of the signals between the cells is compiled. The signal database includes the signal net name or label, the page number on which it is found and whether the signal is an input or an output signal in each particular instance, and a meaningful description of the signal function. This permits the tracking of signals through the high level schematic effortlessly. The database is further designed to sort the data by any of the fields such as by label, by schematic page number, or by input/output, and to reformat the data page by page. In addition, it includes the facility to rename the initial signal labels which are usually somewhat arbitrary to a user defined descriptor label which is more representative of what they actually are. For instance the clocking signals could be labelled clk1, clk2, . . . On renaming the label in the database, the labels on the associated schematic would be updated. In addition, a brief description of each label could be maintained in the database and a trace of all renaming activities could be maintained. An advanced schematic editor and navigator of the type described in a co-pending application entitled Advanced Schematic Editor filed by Gont et al on even date herewith and which is incorporated herein by reference, may be used for performing advanced editing functions on the project schematic netlist data.

In order to implement the process in accordance with the present invention, the schematic organization tool comprises seven functional modules. The modules will be described with reference to ViewGen software from ViewLogic/Innoveda, though it can equally well be implemented with any other image manipulation and display software. The modules include a cell extractor module, a cell flattener module, a layout interface module, a signal list applications module which includes a figure list, signal extractors, signal error check, signal data I/O format, signal rename, gate length modifier and an editor of "local" signal pin segments module which cleans up local pin segments that are mistakenly created, and a wire list converter module which modifies floating signals.

Cell Extractor Module—Most analysis project schematics or project data sets contain a large number of components such as transistors/gates that represent the lowest level of circuit hierarchy. The transistors/gates are not organized in any way and are placed on numerous schematic pages arbitrarily by ViewGen of ViewLogic/Innoveda or some other software which is capable of viewing and editing schematics. There is a constant need to group the components into meaningful cells to build a circuit hierarchy.

In the cell extractor module, a user creates the following three files that represent a cell as a functional schematic block:

1. A cell schematic file by placing components such as transistors/gates on a new schematic page, connecting them in an appropriate way, and defining IN/OUT pin components.
2. A cell symbol file by either drawing a symbol on a new symbol page or generating the symbol using ViewGen software. Pintype and Pinorder properties are required for every symbol.
3. A wire file of all of the interconnecting wires or signals between the components in each cell.

The cell extractor module creates a cell template that contains an array of components such as transistors/gates. Each of the components has following properties:

1. Name of the component, for example NAND2, SI4142@00001.
2. Labels of all wires, also known as signals or nets, connected to the component pins.
3. Scope of the wires connected to the component pins, local indicates that the wire belongs to the cell only, and global indicates that the wire is connected to another component outside the cell.
4. Component pin order, for example A,B,C,QN.
5. Digital mapped nodes which are unique integers that represent unique string labels.

Figure 4:
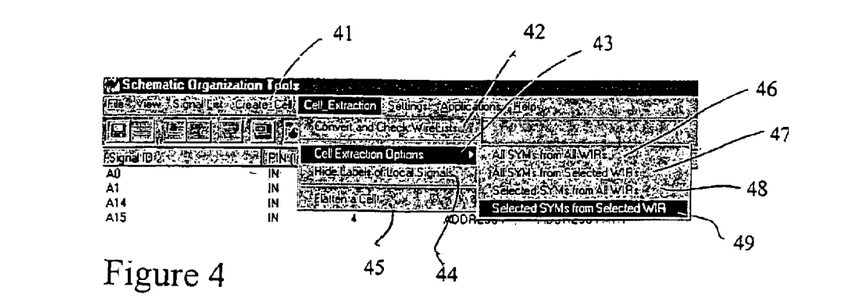
FIG. 4 is a GUI illustration of the Schematic Organization Tool highlighting cell extraction.

Cells to be extracted by the SOT cell extractor may be created in two ways, by schematic and from layout. In the first case, as noted above, the components of a cell may be drawn on a schematic page with their interconnections from which a cell wire file is created. In addition, an appropriate symbol with its inputs and outputs may be drawn to represent the cell. These cell schematics, wire files and symbols may be placed in a library for future use or they may be used immediately for cell extraction. Alternately, as will be described below in Layout Interface, it may be desirable to create a cell directly from the layout of the integrated circuit. This is particularly desirable when common patterns are seen on the circuit layout but due to reasons such as component density, it may not be possible to identify a cell structure. In such a case, a polygon is drawn around the area of interest and the Create Cell 41 function shown on FIG. 4 is clicked. A cell wire file of all of the components within the polygon will be generated. In the same way as noted above, a symbol is drawn to represent the cell in question.

The template data is extracted from the user created symbol file (SYM) and wire file (WIIR) created by the array of components for a particular cell. The SOT software rearranges the array data in such way that subsequent components have at least one common wire with any of the preceding components in the rearranged array. Next, the software combines all wire files into one entitled a virtual net list. The virtual netlist is used to perform search and replace of similar cell component arrays spread throughout the different pages by the cell symbol. The virtual net list is separated into the original file configuration after the extraction is complete. After the virtual net list is created, the software extracts all components from the project virtual net list based on the same names as cell component names to produce candidate arrays. The candidate array components have their properties similar to the cell components. The node labels which are the pins of the components in the cell array, are digitally mapped giving them an unique integer value to represent each unique string label. In order to find the same template pattern in the candidate array, the software compares each of the candidate's nodes to see if they are interconnected or not i.e. to be equal or not equal to the nodes of the preceding candidate's nodes in the same way that the nodes are equal or not equal in the template components. The software removes all lines belong to extracted candidates from the virtual net list. Then at the end of all extractions of a cell, the software will write new cell symbol descriptions and cell definition overhead into the header of each net list.

The final result of the cell extractor is a wire file with all cell components removed and substituted with the cell symbol descriptions. The user can run a schematic generator to create the new schematic pages.

The graphical user interface (GUI) of the cell extractor includes following components as illustrated in FIG. 4: convert and check wirelist 42, cell extractor options 43, hide labels of local signals 44 and flatten a cell 45. There are four sub menu items in cell to seek to extract all cell symbols in the symbol files from all wire files 46, to seek to extract all cell symbols from selected wire files 47, to seek to extract selected cell symbols from all wire files 48, or to seek to extract selected cell symbols from selected wire files 49 to give a user maximum flexibility to perform extractions. It may be desirable to only extract a few cells from all of the wire files or from selected wire files to see what is happening, on the other hand, if it is evident that certain cells do not exist in some wire files, these wire files could be skipped during processing by using all cell symbols from selected wire files.

Figure 5:
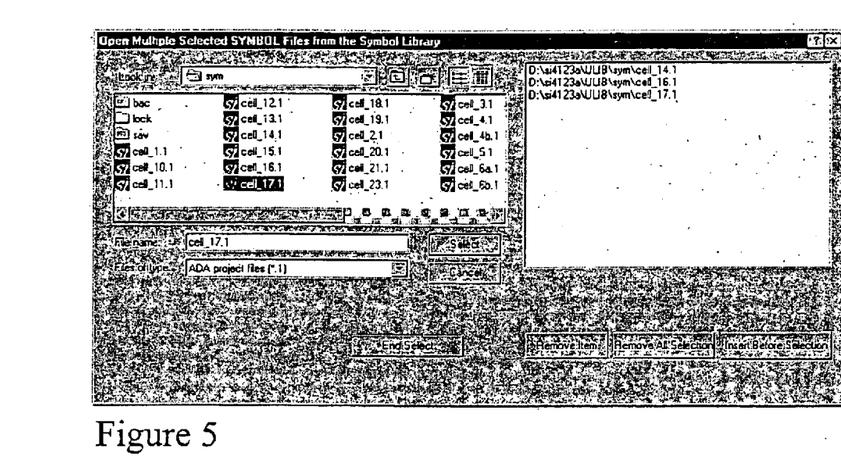
FIG. 5 is a GUI illustration of a library of cells.
Figure 6:
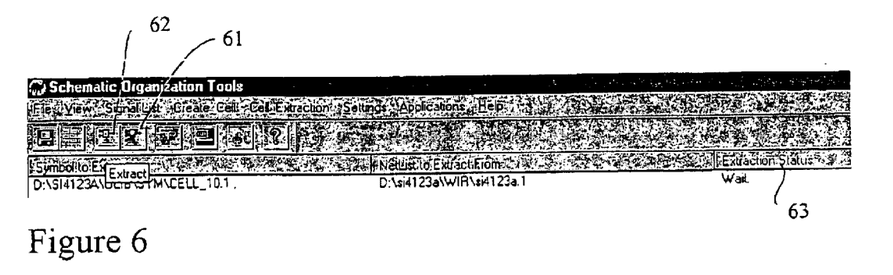
FIG. 6 is a GUI illustration of the Schematic Organization Tool highlighting the extract command.

When it is desired to extract selected symbols, the symbol selection dialog interface illustrated in FIG. 5 will open up. In this way the symbols to be extracted may be selected in what ever order the user wishes. Once the selection is made, the extraction toolbar button Extract 61 shown in FIG. 6 will initiate the extraction, while the button Do Not Extract 62 removes all selections. As extractions take place, a status bar reflects the status of the extraction process by showing the cell name of the current cell being extracted and the running total of extracted cells. At the end of the extraction the "Extraction status" 63 field of the list control will output the results of each cell extraction.

Figure 7:
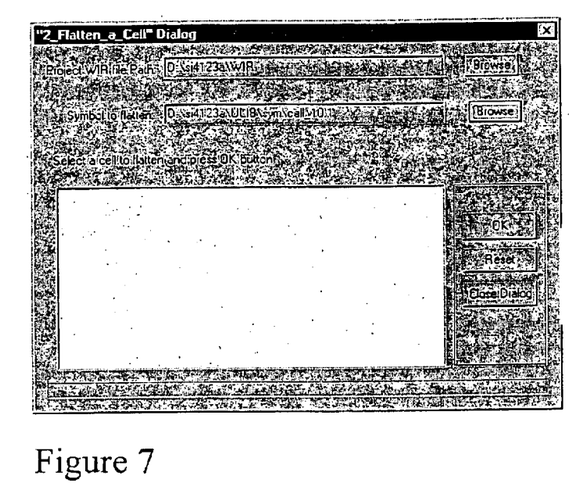
FIG. 7 is a GUI illustration of the cell flattener.

Cell Flattener Module—This process reverses the cell extractor results whereby a cell can be replaced by the components that made it up. The process will replace all cell occurrences with its components. The GUI is illustrated in FIG. 7.

Layout Interface Module—This module is used to cluster layout components such as transistors/gates into a logical functional block or cell. The layout data is stored in a GDS file as objects in a vector type format. The transistor/gate data is written into SPICE files of Automated Design Analysis projects. The user is able to:

1. Group layout components that are near to one another into meaningful blocks, as noted above for cell creation; or 2. Split a project based on the layout topography as illustrated in FIG. 1b into more manageable and smaller subprojects; and 3. Generate wire files and then schematic files of any particular layout blocks or areas of interest.

The layout interface of SOT provides analysts with a bridge from GDSII type layout to gate/transistor schematics. Prerequisites of the layout interface functionality are a project GDSII file and ViewLogic/Innoveda library directory structure (ex: ULIB). Prior to the use of the SOT layout interface the user is required to modify the layout data in any editors, for instance L-EDIT. The modifications include creation polygon boundaries around areas of interest. The polygon data is stored in the GDSII file on the layer 55 which is reserved for the cell extraction (item 1 above) and on the layer 58 for splitting the project in parts (item 2 above). The layout is a three dimensional picture of the integrated circuit, layers 55 and 58 are layers well above the layers required for actual integrated circuit layers.

The software prompts a user to select a project GDSII file and the output library directory. The rest is transparent to the user and the results of the process will be shown in a summary.

The software opens the user specified GDSII file to extract data about polygons such as names of boundaries and their coordinates. The data is stored in a dynamic array of polygon property structures. Next, the software opens an appropriate project spice file that contains database on all gates of the project in their correspondence to the GDSII data. Then, the layout interface collects all gate coordinates of which fall into the boundaries extracted from the GDSII file. Finally the software creates wire file for all boundaries and names them by the boundary names. The wire files are the gate databases that describe all components within the polygon boundary and the way they are interconnected to each other.

In order to have schematic pages of the extracted polygons and project parts (if the project is split), the user applies ViewLogic/Innoveda ViewGen application. The ViewGen takes wire files created by the SOT layout interface as the project input and generates schematic and/or symbol files.

Signal List Module—This module provides analysts with a tool for fast and reliable schematic data processing, the automation of time consuming routines. These custom created tools perform engineering specific tasks. There are no other third party tools presently available. Data collection, modification and storing are very time consuming, it often takes days to do just one loop of these operations.

The application is a single document Windows software. It utilizes MFC CListCtrl to output extracted and organized data. There are alphanumeric ascending and descending sort options available. The software saves all user data into a set of predefined meaningful file names ("Save") as well as into user created names ("Save As"). All saved files are in the text format with an extension "*.DOC" to utilize MS Office Word software for customer reports.

The options available are to:

1. List all signals, therefore extracting all wire labels from the data files, or 2. List PIN signals only, therefore to extract only input/output labels from the data files and are therefore schematic page related.

Both options contain two sub options, namely to extract from:

1. All schematics and therefore to process all schematic files of a project; or

2. To exclude SYM file signals and to process only those schematic files that do not have a SYM file—this sub option extracts top level signals.

An example of an extract all signals is illustrated in FIG. 8 while an example of an extract PIN signals only is illustrated in FIG. 9.

There are a number of subsets under the Signal List Applications. For instance, the user can obtain a list of all of the data files by figure number. The Figure List includes the figure numbers, a title for the figure and the data file where it can be found.

Signal Error Check will verify the signal list to check for anomalies in the list. For instance it will verify that matching signals exist and if they don't the anomaly will be highlighted.

Under Signal Data I/O Format, all input and output signals are listed indicating the schematic page where it originates and the page or pages where it goes.

Signal Rename allows the user to change the label of a signal, the name change will take place on all of its occurrences.

All gates/transistors have physical dimensions such as width, length and height, the parameter length may be modified if it is found that the size of a particular gate/transistor has been inserted in error. Gate Length Modifier can be used to search through the file and modify the data to correct the length of a particular type of gate/transistor.

ViewLogic/Innoveda was not designed to carry out reverse engineering tasks, ViewLogic/Innoveda can therefore create a number of wires that either do not originate anywhere or do not go anywhere. The Editor of Local Signal Pin Segments will move through the entire data base and remove such wires.

The Wire List Converter module is able to search the entire signal list to find the floating signals which are missing wires. These signals are not shown in the schematics but they are written into wire file all with the same label "???". Thus it would appear that all floating signals are identical. In order to keep uniqueness of nets and to show "floating signals" to analysts, the software will find them and label as "FLOAT_#". First, the software opens all wire files searching for labels masked as "FLOAT_*". The asterisk represents an integer value starting from zero. Second, the software analyses the integer value of found float signals and uses the max value as a starting point for the subsequent conversion. Third, the converter runs through wire files again to search for floating signal labels in component records. Next, it replaces all "???" labels with the masked labels as following: FLOAT_D, where D is the subsequent integer value of the max index increased by one at each substitution.

The user interface includes a file open dialog to point to a project files and the status bar that indicates the progress of the conversion. The SOT main interface includes menu and tool bar items that are responsible for invoking of process automation supporting applications, such as: ViewDraw, ViewGen, Equivalence, Netlist organizer, Shorts, and so on.

Figure 10:
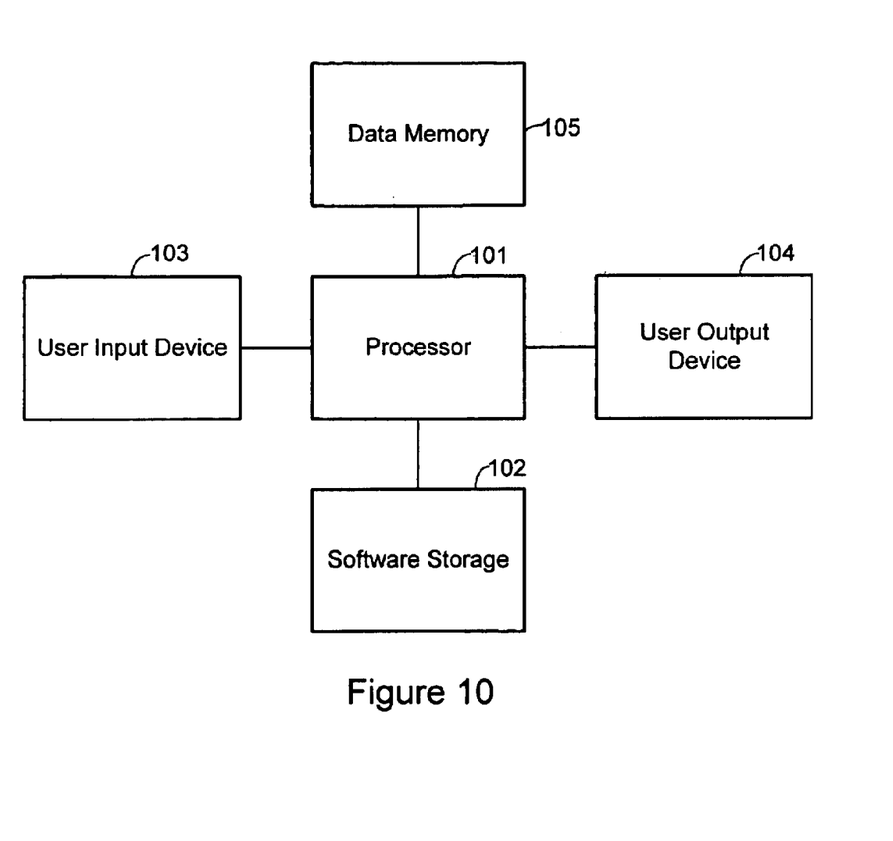
FIG. 10 illustrates a computer system for implementing the invention.

The above invention is implemented using a computer system 100 of the type illustrated in FIG. 10. The system 100 includes a processor 101 connected to a software storage device 102 which controls the processor 101, a user input device 103, a user output device 104 and a memory 105 for storing the data generated and organized by the system.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A process in a computer system for generating a high level schematic from a project schematic of basic components, comprising:
   a. scanning the project schematic for all instances of a predetermined cell, wherein the predetermined cell comprises a select group of components and their interconnections;
   b. replacing each instance of the select group of components and their interconnections found in the project schematic by a cell symbol having inputs and outputs to generate the high level schematic, wherein steps (a) and (b) are performed automatically by the computer system;
   c. repeating steps (a) and (b) for other predetermined cells.

2. The process in claim 1 wherein the project schematic comprises a project netlist of components and their interconnections.

3. The process as claimed in claim 2 wherein step (a) includes generating a cell netlist of the select group of components and their interconnections.

4. The process as claimed in claim 2 wherein step (a) includes selecting a cell netlist of the select group of components and their interconnections from a library of cell netlists.

5. The process as claimed in claim 2 wherein step (a) includes creating a cell schematic of a group of components and their interconnections, and generating a cell netlist of the cell schematic.

6. The process as claimed in claim 2 which further includes the step of generating a netlist of the high level schematic.

7. A process in a computer system for generating a high level schematic from a project schematic of basic components, comprising:
   a. scanning the project schematic for a predetermined cell, wherein the project schematic comprises a project netlist of components and their interconnections and wherein the predetermined cell comprises a select group of components and their interconnections;
   b. replacing the group of select components found in the project schematic by a tell symbol having inputs and outputs to generate the high level schematic
   c. repeating steps (a) and (b) for other predetermined cells;
   d. generating a high level netlist of the high level schematic; and
   e. creating a database from the high level schematic netlist of the signal between the cells wherein the signals are identified by a defined label, a schematic page number where they are found, and the signal's function as an input/output signal, wherein steps (a)–(e) are performed automatically by the computer system.

8. A process in a computer system for generating a high level schematic from a project schematic of basic components, comprising:
   a. dividing the project schematic into two or more sub-projects;
   b. generating an individual project netlist for each sub-projects;

c. scanning the subproject schematics for a predetermined cell, wherein the predetermined cell comprises a select group of components and their interconnections;

d. replacing the group of select components found in the subproject schematics by a cell symbol having inputs and outputs to generate the high level schematic for each subproject, wherein steps (a)–(d) are performed automatically by the computer system; and e. repeating steps (c) and (d) for other predetermined cells.

9. The process as claimed in claim 8 which further includes the step of generating a netlist of the high level schematic.

10. A method in a computer system for manipulating data from a high level schematic comprising cell names, signal labels for input and output signals between the cells, and cell schematic page numbers on which each signal is found, the method comprising:

a. sorting the data by signal labels;

b. sorting the data by inputs and outputs;

c. sorting the data by schematic page number;

d. renaming the signal labels; and e. describing the cell functions.

11. A method in a computer system for manipulating data from a high level schematic, comprising cell names, signal labels for input and output signals between the cells, and cell schematic page numbers on which each signal is found, the method comprising:

a. sorting the data by signal labels;

b. sorting the data by inputs and outputs;

c. sorting the data by schematic page number;

d. renaming the signal labels;

e. describing the cell functions;

f. checking the signals for errors;

g. modifying the gate length data;

h. editing local pin segments; and i. converting signal labels with identical labels to signal labels with unique labels.

* * * * *

UNITED STATES PATENT AND TRADEMARK OFFICE
CERTIFICATE OF CORRECTION

PATENT NO. : 6,738,957 B2
DATED : May 18, 2004
INVENTOR(S) : Val Gont

It is certified that error appears in the above-identified patent and that said Letters Patent is hereby corrected as shown below:

Column 10,
Line 49, delete "tell" and insert -- cell --.
Line 50, after "schematic" insert -- ; --.
Line 56, delete "signal" and insert -- signals --.
Line 67, delele "sub-projects" and insert -- sub-project --.

Signed and Sealed this

Twenty-ninth Day of March, 2005

JON W. DUDAS
*Director of the United States Patent and Trademark Office*